United States Patent [19]

Irani

[11] 3,920,446

[45] Nov. 18, 1975

[54] METHODS OF TREATING SILICIOUS MATERIALS TO FORM SILICON CARBIDE FOR USE IN REFINING FERROUS MATERIAL

[75] Inventor: Meherwan C. Irani, Pittsburgh, Pa.

[73] Assignee: Eugene F. Buell, Pittsburgh, Pa. ; a part interest

[22] Filed: Apr. 24, 1974

[21] Appl. No.: 463,658

Related U.S. Application Data

[63] Continuation-in-part of Ser. No. 855,766, Sept. 5, 1969, Pat. No. 3,836,356, which is a continuation-in-part of Ser. No. 764,041, Sept. 26, 1968, abandoned.

[52] U.S. Cl. .................... 75/51; 75/36; 423/345
[51] Int. Cl.² .......................................... C21C 7/00
[58] Field of Search ............... 75/24, 36, 60, 51, 52; 423/345

[56] References Cited
UNITED STATES PATENTS

| | | | |
|---|---|---|---|
| 1,859,856 | 5/1932 | White | 423/345 |
| 3,579,325 | 5/1971 | Stone et al. | 75/60 |
| 3,836,356 | 9/1974 | Irani | 423/345 X |

FOREIGN PATENTS OR APPLICATIONS

| | | | |
|---|---|---|---|
| 727,497 | 4/1955 | United Kingdom | 423/345 |
| 3,712,398 | 8/1962 | Japan | 423/345 |

*Primary Examiner*—M. J. Andrews
*Attorney, Agent, or Firm*—Buell, Blenko & Ziesenheim

[57] ABSTRACT

A method is provided for treating oxygen bearing silicious materials, particularly those containing ferrous metal to produce silicon carbide and metallic iron comprising the steps of mixing a silicious material with at least a stoichiometric amount of carbon to combine with the oxygen bearing silicon compounds in the material to form silicon carbide and to reduce the oxygen compounds of iron to the metallic state, heating the mixture in a non-oxidizing atmosphere to a temperature in excess of 2500°F., holding the temperature until there is no further reaction between silicon and carbon, comminuting the resulting product to free any metallic iron formed, separating the metallic iron magnetically and collecting the non-magnetic residue as silicon carbide.

11 Claims, No Drawings

METHODS OF TREATING SILICIOUS MATERIALS TO FORM SILICON CARBIDE FOR USE IN REFINING FERROUS MATERIAL

This application is a continuation-in-part of my copending application Ser. No. 855,766, filed Sept. 5, 1969 now U.S. Pat. No. 3,836,356, which was a continuation-in-part of my application Ser. No. 764,041, filed Sept. 26, 1968 now abandoned.

This invention relates to methods of treating silicious materials and metal refining and particularly those containing ferrous metal and particularly to a method of utilizing iron bearing silicious materials such as tailings from the mining and concentration taconites, non-magnetic semi-taconites, low-grade highly silicious iron ores, tailings resulting from mining and concentration of porphyry copper and molybdenum ores to produce metallic iron.

The present invention is peculiarly important at the present time because it provides a solution to the pollution problem created by waste materials resulting from mining, processing and/or beneficiating of mineral materials. In addition, this invention makes it commercially feasible and possible to utilize the quantities of iron contained in vast resources of semi-taconites which are low-grade silicious iron ore deposits occuring in the Great Lakes region of the United States and Canada as well as in other parts of the world. These semi-taconites and other low-grade silicious iron ores may be economically utilized by the process of this invention. At the same time it provides a solution to another problem, i.e., the greater utilization of ferrous scrap resulting from discarded ferrous materials.

In the smelting and refining of iron and steel, the use of ferrous scrap offers the advantage of increasing iron and steel production without installation of additional blast furnaces, coke ovens, iron ore mining and processing facilities and large handling and transporting facilities for these materials. It is well known that in the oxygen refining process for molten iron (BOF process) where heat is generated as a result of oxidation of silicon, manganese and carbon present in the molten iron, the amount of ferrous scrap which can be recycled is limited, in normal operations, to about 30 percent of the molten iron charged to the furnace. In order to find ways in which more scrap can be used in the basic oxygen furnace process of refining steel, use of silicon carbide and calcium carbide as an addition to hot metal has been investigated. Commercial scale tests have shown that for each pound of silicon carbide added to the molten iron in the basic oxygen furnace, twelve times its weight of ferrous scrap can be melted while calcium carbide melts about 5.5 times its weight. Although slightly more expensive than calcium carbide, silicon carbide is easier and safer to transport, store and use and offers less difficulty with obscured end points. However, commercially produced silicon carbide currently available has been found uneconomical to use due to its high cost.

I have found that by processing waste materials resulting from mining and beneficiation of taconite ores, and by utilizing such processed waste materials in the basic oxygen furnace process of refining steel, larger quantities of ferrous scrap can be utilized. I have also found that by utilizing such processed waste materials in the basic oxygen furnace, it is possible to produce refined steel from iron and steel scrap, prereduced iron ore and other iron bearing materials without using added molten iron. I have found that by processing waste iron bearing silicious materials with carbonaceous materials like coal, petroleum refinery residues, coal tar, and such other materials, at a temperature in excess of 2500°F. in a reducing or neutral atmosphere, i.e. a nonoxidizing atmosphere, a product consisting of a mixture of silicon carbide and metallic iron is produced. Such an atmosphere is created by the burning hydrocarbons released from the carbonaceous materials. I have discovered that by utilizing products resulting from such processing, it becomes possible to produce and refine iron more economically by utilizing higher proportion of ferrous scrap to hot metal than is being done at the present time. I have also found that by successful use of the process of my invention, it is possible to completely eliminate the necessity of adding molten iron in refining of steel by the basic oxygen process.

I have also found that, instead of using the mixture of silicon carbide and metallic iron as a part of a refining charge, by comminuting the resulting product by grinding, crushing or the like it is possible to separate metallic iron by magnetic means leaving a non-magnetic residue which is predominatly silicon carbide. This silicon carbide can be collected and used in making abrasives, as metallurgical additives and for other purposes to which silicon carbide is conventionally used.

Starting materials for the process according to my invention may be tailings resulting from taconite mining annd beneficiation operations, other iron bearing silicious materials resulting from mining, dredging and processing of mineral materials such as sand and gravel, guartzite, sandstone or any other materials containing iron and silicon. Any or all of these materials or mixtures thereof may be used. These materials furnish the source of silicon needed for the process.

The carbonaceous materials required for the process may be coking or non-coking coal, anthracite, lignite, chars, pitch, coal tar, petroleum refinery residues, crude oil, petroleum coke, charcoal, wood, waste materials of pulp and paper industry or any other carbonaceous materials of any origin. Any of these materials above or in combination may be used as a source of carbon required for the process.

While any or all of these materials could be used, the preferred materials are tailings resulting from beneficiation of taconites and coking coal.

The procedure of the process is as follows:

Conversion of iron containing silicious material to a product containing silicon and metallic iron. This is accomplished by reacting at temperatures in excess of 2500°F. such iron containing silicious materials with carbon containing materials, preferably coking coal. The resulting silicon carbide and metallic iron may be separated for subsequent use of the mixed products of reaction consisting of a mixture of silicon carbide, iron, and carbon, together with other constituents present in the iron bearing silicious material and carbonaceous materials may be used as such. Any one of these products may be added to a molten bath of steel, to the basic oxygen furnace, to a blast furnace charge or to the iron melting cupola in which iron or steel scrap is being melted. The silicon carbide in the product furnishes silicon required for the production and processing of iron and steel.

The following specific example will illustrate the process:

EXAMPLE

To one part by weight of minus 14 mesh taconite tailings containing 75 percent silica ($SiO_2$) and 20 percent iron oxides was added two parts by weight of Pittsburgh coking coal crushed to minus quarter inch size. The mixture was coked at 3000°F. in absence of air over a period of six hours till the coked product attained a temperature of 3000°F. At 3000°F. the silica and iron oxide react with carbon according to the following reactions:

$$SiO_2 + 3C = SiC + 2CO$$
$$Fe_2O_3 + 3C = 2Fe + 3CO$$

The coked product was maintained at 3000°F. for an additional hour and then removed from the oven and quenched in water. The analysis of the quenched material showed that almost all of the silica originally present in the iron bearing silicious material was converted to silicon carbide. Enough of the quenched material was added to a 2900°F. batch of molten iron substantially free from silicon till the silicon content of the metal was 1 percent. A high velocity jet of oxygen gas was injected onto the surface of the molten iron. As the temperature of the molten iron rose, enough scrap was added to the molten iron to maintain its temperature constant. Samples of molten iron were periodically withdrawn and analyzed for silicon content. When the silicon content of the molten metal showed 0.1 percent silicon, the oxygen was shut off. It was found, that for every pound of silicon carbide contained in the coked product added to the molten iron, 12 pounds of scrap steel was melted at the constant bath temperature of the molten iron. Throughout the test, the oxides of silicon resulting from the exothermic reaction of silicon and oxygen were slagged out by addition of sufficient lime (CaO) to form a basic slag over the molten iron. Almost all the slag and a part of the molten iron was removed and to the remainder of the molten iron, another batch of the coked material was added to bring the silicon content of the molten iron up to 1 percent. Again, the jet of oxygen was turned on and the high velocity jet of oxygen was injected onto the surface of the molten iron. Scrap steel was added to the molten bath to maintain the molten iron at constant temperature and the above described procedure was repeated. It was found that iron can be refined continuously into steel directly from scrap steel without using any external source of molten iron, the exothermic reaction of silicon and carbon introduced into the initial charge of molten iron being sufficient to melt the scrap iron added to the bath of molten iron.

A second portion of the product was ground and passed over a magnetic separator which removed the metallic iron and the balance of the material was collected as silicon carbide with a small amount of carbon residue.

My research to date has shown that when iron containing silicious material is mixed with a carbon containing material and the mixture heated to temperatures in excess of 2500°F. in a reducing or neutral atmosphere, the iron oxides in the mixture are reduced to metallic iron and the silica combines with carbon to form silicon carbide. The time necessary for the completion of the formation of silicon carbide is a function of temperature. I have found that by prior coking at a temperature of over 2500°F. the iron bearing silicious material with enough coking coal to furnish carbon in excess of the stoichiometric amount required for the conversion of silica and iron oxides to silicon carbide and metallic iron, conversion of better than 95 percent of $SiO_2$ to SiC are achieved. I have found that under such conditions essentially all of the silica in a mixture of one part by weight of minus 14 mesh taconite tailings with two parts by weight of Pittsburgh coking coal is converted to silicon carbide when heated for 1 hour at 3000°F, in a reducing atmosphere. The resulting product, as such, is suitable for use in iron and steel smelting and refining, and for addition of iron, silicon and carbon to foundry iron in cupola, ladle, or runners as was first disclosed in my application Ser. No. 764,041 filed Sept. 26, 1968. The coked material may be further upgraded by grinding it and separating the iron magnetically from the ground product, igniting the carbon contained in the non-magnetic fraction and leaching out the non-silicon carbide mineral constituent with strong mineral acids. The treated product so prepared is suitable for manufacture of high silicon steel, silicon carbide ceramics and as a chemical raw material for manufacture of silicon compounds.

Many changes can be made in the details of steps of the process without departing from the spirit of the invention. The inventor, therefore, does not wish to be restricted to the exact details and arrangements described, the preferred forms, and steps only have been shown and described by way of illustration. Any iron bearing silicious material can be used. Any carbonaceous material may be used as a source of carbon, the silica and iron constituents of the inorganic matters which may be present in the carbonaceous maaterial being not detrimental to the process. The furnace in which the material is processed may be fired by coal, gas, oil, electricity or a combination of fuels. The atmosphere within the furnace may be reducing or inert, i.e., non-oxidizing. The ratio of fixed carbon to the silicious material may be in stoichiometric proportion necessary for the formation of silicon carbide from the silicious constituents of the charge to the furnace or a several fold excess of carbon may be used. In practice, the amount of carbon used will be determined by the contemplated use of the processed product and the type of furnace in which the process is conducted; for example, when a rotary hearth furnace is used, sufficient excess coal may be added to liberate enough volatile materials to furnish the heat required to maintain the furnace at the desired reaction temperature in a reducing atmosphere. The carbon containing material may be powdered coal, anthracite, coke breeze, sawdust, chars, coal tar, residues from petroleum refining, pitch or any other carbonaceous material of mineral or vegetable origin or mixtures of these materials. In short, carbon, as referred to herein, may be one of the forms of relatively pure carbon, coal, coke, ferro-coke, or a constituent of a complex carbonaceous material. The mixture of iron containing silicious material and carbonaceous material may be heated as such or the silicious materials may be initially carbonized or coked with a carbonaceous material or a mixture of carbonaceous materials in desired proportions and then heated to desired reaction temperature in a suitable furnace. Alternatively, the mixture of silicious and carbonaceous materials may be ground together or mixed together after being ground separately, and the mixture converted into pellets with or without the addition of binding materials like sodium silicate or bentonite clay and the pellets fired to the desired reaction temperature in a furnace in which a reducing atmosphere is maintained.

The process of this invention may be conducted in a rotary kiln, by product coke ovens, beehive coke ovens, grate type furnace, tunnel kiln, rotary hearth furnace, electric resistance or induction type furnace or any other furnace in which a temperature in excess of 2500°F. in a reducing or inert atmosphere may be obtained. While any of these furnaces may be used, the most preferred furnaces are the by product type coke ovens, beehive coke ovens and the rotary hearth type furnace in which the combustion of volatile matter liberated from the coal is burned within the furnace under reducing condition.

The silicon carbide bearing products obtained by the process of this invention can be added to the steel processing operation in the basic oxygen furnace, iron melting cupola, electric furnace, blast furnace, open hearth, or other types of melting furnaces or they may be added in runners which convey the molten metal from the melting or smelting device to the place where it is to be processed further or they may be added in ladles or in a mixing device. Various other additions may be made to the product prior to its utilization.

Successful use of this invention will abate the disposal problem connected with waste tailings resulting from taconite mining and processing operations by converting it into a useful product. It would also make it possible to utilize a large proportion of ferrous scrap in the smelting of steel in the basic oxygen process. It will conserve the Nation's reserves of iron by econimically recovering the iron being currently discarded in the tailings resulting from iron ore beneficiating operations. The process of this invention will make it possible to utilize large quantities of iron contained in the non-magnetic taconites or semi-taconite deposits. It will also permit utilization of very large quantities of iron bearing silicious tailings resulting from the mining and processing of copper and molybdenum from the large porphyry deposits of these metals in the Western United States and other parts of the world. Such tailings currently present serious disposal and pollution problems and are being stored in large piles. The process of this invention by converting these waste materials into useful products will solve the disposal and pollution problems associated with these materials and will also make available the land presently being used for storage of these waste materials for other more useful purposes and eliminate the eyesore resulting from these huge piles of waste materials. Very large quantities of taconite tailings are at present being dumped into the Great Lakes adjacent to the large mining and processing plants. Dumping of these tailings into the lakes present serious hazard to the aquatic life of the lakes and jeopardize the quality of these waters. The process of my invention, by economically converting these tailings into useful products will eliminate this serious disposal and pollution problem. Currently, the tailings from the taconite beneficiation plants contain as much as 13 percent iron. Successful utilization of the process of my invention will prevent irrevocable waste of the Nation's irreplaceable iron resources by recovering the iron content of these tailings.

While I have disclosed certain preferred practices of my invention in the foregoing specification, it will be understood that this invention may be otherwise embodied within the scope of the following claims.

I claim:

1. A process for ferrous metal refining comprising the steps of mixing silicious material containing oxygen bearing silicon compounds and oxygen compounds of iron with at least a stoichimetric amount of carbon to combine with the oxygen bearing silicon compounds in the material to form silicon carbide and reduce oxygen compounds of iron to the metallic state, heating the mixture in a first vessel in a nonoxidizing atmosphere to a temperature in excess of 2500°F., holding the temperature till there is no further reaction between the oxygen bearing silicon compounds and carbon, removing the resulting product from said first vessel, adding the resulting product to molten ferrous metal in a second vessel, adding ferrous scrap and lime for slag formation to the molten metal, injecting high velocity jets of oxygen gas onto the surface of the molten ferrous metal till the silicon and carbon contents of the molten ferrous metal have attained the desired level, adding ferrous material to the molten iron in an amount sufficient to maintain the desired ferrous metal pouring temperature, separating the molten slag from the molten ferrous metal and pouring the resulting molten ferrous metal into molds, to convert the molten ferrous metal into solid forms.

2. A process as claimed in claim 1 in which the iron containing silicious material is heated with an excess of carbonaceous material above that stiochiometric amount necessary to form silicon carbide with the silicious material.

3. A process as claimed in claim 1 wherein a portion of molten ferrous metal is retained in the second vessel to form the molten metal and repeating the steps of the process beginning with the addition of the resultant product from the first vessel to the molten metal in the second vessel.

4. A process as claimed in claim 1 wherein the ferrous material added to maintain the desired pouring temperature is selected from the group consisting of ferrous scrap, prereduced iron, iron ore lumps, concentrate pellets and ore briquettes.

5. A process as claimed in claim 1 wherein the carbon is in the form of coking coal and the mixture is coked in the first vessel which is a coking furnace at a temperature in excess of 2500°F. in a non-oxidizing atmosphere generated by the partial combustion of the volatile matter released within the furnace by the coking of the coal.

6. A process as claimed in claim 5 wherein the coking furnace is a rotary hearth furnace.

7. A process as claimed in claim 5 wherein the coking furnace is a by product coking furnace.

8. A process as claimed in claim 5 wherein the coking furnace is a beehive coking furnace.

9. A process for ferrous metal refining comprising mixing silicious material with sufficient carbonaceous material containing oxygen bearing silicon compounds and oxygen compounds of iron to combine with the oxygen bearing silicon compounds in the silicious material to form silicon carbide and reduce oxygen compounds of iron to metallic iron, heating the mixture in a non-oxidizing atmosphere to a temperature in excess of 2500°F., holding the temperature till there is no further reaction between the oxygen bearing silicon compounds and carbon, grinding the resulting product to liberate the particles of metallic iron, removing the metallic iron magnetically, adding the non-magnetic residue to powered iron ore or iron ore concentrates, agglomerating the mixture, adding the resulting agglomerated product to molten ferrous metal, adding ferrous scrap and lime to the molten ferrous metal, injecting high velocity jets of oxygen gas onto the surface of the molten ferrous metal till the contents of the silicon and carbon have attained the desired level, adding ferrous metal the group consisting of ferrous scrap iron ore lumps concentrate pellets and mixtures thereof to the molten ferrous metal in an amount sufficient to attain the desired final ferrous metal pouring temperature, separating the molten slag from the molten ferrous metal, and pouring the resulting molten ferrous metal into molds, to convert it into solid forms.

10. A process as claimed in claim 9 in which after magnetically removing iron from the processed iron containing silicious material the non-magnetic residue is ignited in air to burn out the carbon, the ignited residue than being agglomerated.

11. A process as claimed in claim 10 in which after igniting the non-magnetic residue in air, the resulting product is treated with one or more of the mineral acids consisting of sulfuric, hydrochloric, nitric or hydrofluoric acid of mixtures thereof to dissolve all of the non-silicon carbide constituents of the product, washing the product in water, decanting, filtering and drying product, agglomerating the dried product and adding the resulting product to molten iron.

* * * * *